US010961919B2

(12) United States Patent
Beauchesne-Martel et al.

(10) Patent No.: US 10,961,919 B2
(45) Date of Patent: Mar. 30, 2021

(54) CORRECTED PARAMETERS CONTROL LOGIC FOR VARIABLE GEOMETRY MECHANISMS

(71) Applicant: PRATT & WHITNEY CANADA CORP., Longueuil (CA)

(72) Inventors: Philippe Beauchesne-Martel, Brossard (CA); Poi Loon Tang, Montreal (CA); Andrew Thompson, Longueuil (CA); Ghislain Plante, Verdun (CA)

(73) Assignee: PRATT & WHITNEY CANADA CORP, Longueuil (CA)

( * ) Notice: Subject to any disclaimer, the term of this patent is extended or adjusted under 35 U.S.C. 154(b) by 202 days.

(21) Appl. No.: 16/033,142

(22) Filed: Jul. 11, 2018

(65) Prior Publication Data
US 2019/0063331 A1    Feb. 28, 2019

Related U.S. Application Data

(60) Provisional application No. 62/551,409, filed on Aug. 29, 2017.

(51) Int. Cl.
*F02C 9/20* (2006.01)
*F02K 3/04* (2006.01)
*F04D 27/02* (2006.01)

(52) U.S. Cl.
CPC .................. *F02C 9/20* (2013.01); *F02K 3/04* (2013.01); *F04D 27/0246* (2013.01); *F05D 2270/023* (2013.01); *F05D 2270/052* (2013.01); *F05D 2270/053* (2013.01); *F05D 2270/303* (2013.01); *F05D 2270/304* (2013.01);
(Continued)

(58) Field of Classification Search
CPC .......... F02C 9/20; F04D 27/0246; F02K 3/04; F05D 2270/71; F05D 2270/335; F05D 2270/052; F05D 2270/053; F05D 2270/304; F05D 2270/023; F05D 2270/3011; F05D 2270/303
See application file for complete search history.

(56) References Cited

U.S. PATENT DOCUMENTS

| 8,087,870 B2 | 1/2012 | Flucker et al. |
| 8,649,954 B2 | 2/2014 | Boyer et al. |
| 8,909,454 B2 | 12/2014 | Minto |

(Continued)

FOREIGN PATENT DOCUMENTS

| EP | 1063402 | 12/2000 |
| EP | 1548236 | 6/2005 |

(Continued)

*Primary Examiner* — Nga X Nguyen
(74) *Attorney, Agent, or Firm* — Norton Rose Fulbright Canada LLP

(57) ABSTRACT

Herein provided are methods and systems for controlling an engine having a variable geometry mechanism. A pressure ratio between a first pressure at an inlet of the engine and a predetermined reference pressure is determined. An output power for the engine is determined. The output power is adjusted based at least in part on the pressure ratio to obtain a corrected output power. A position control signal for a variable geometry mechanism of the engine is generated based on the corrected output power and the pressure ratio. The position control signal is output to a controller of the engine to control the variable geometry mechanism.

18 Claims, 5 Drawing Sheets

(52) U.S. Cl.
CPC  *F05D 2270/3011* (2013.01); *F05D 2270/335* (2013.01); *F05D 2270/71* (2013.01)

(56) References Cited

U.S. PATENT DOCUMENTS

| | | | |
|---|---|---|---|
| 9,068,470 B2 | 6/2015 | Mills et al. | |
| 2014/0308110 A1* | 10/2014 | Houst | F02B 37/22 415/1 |
| 2016/0040550 A1 | 2/2016 | Do et al. | |
| 2017/0218854 A1* | 8/2017 | Nestico | F01D 17/08 |
| 2017/0284308 A1 | 10/2017 | Myoren et al. | |
| 2018/0135527 A1 | 5/2018 | Asari et al. | |
| 2018/0156227 A1 | 6/2018 | Chapman et al. | |
| 2018/0283288 A1 | 10/2018 | Ishii et al. | |

FOREIGN PATENT DOCUMENTS

| | | |
|---|---|---|
| EP | 2249006 | 11/2010 |
| EP | 3059424 | 8/2016 |
| JP | 6033142 | 11/2016 |

\* cited by examiner

CORRECTED PARAMETERS CONTROL LOGIC FOR VARIABLE GEOMETRY MECHANISMS

CROSS-REFERENCE TO RELATED APPLICATIONS

The present application claims priority under 35 U.S.C. 119(e) of Provisional Patent Application bearing Ser. No. 62/551,409 filed on Aug. 29, 2017, the contents of which are hereby incorporated by reference.

TECHNICAL FIELD

The present disclosure relates generally to gas turbine engines, and more particularly to control of variable geometry mechanisms (VGMs) in gas turbine engines.

BACKGROUND OF THE ART

During aircraft operations consisting of rapid engine transitions from low to high power levels, it is desirable to reduce the response time of the engine in order to achieve a required power. For this purpose, inlet mass flow can be increased by accelerating the gas generator of the engine, thereby increasing the engine's power. This may be achieved by a variety of techniques which adjust the shape or geometry of one or more components of the engine, called variable geometry mechanisms, thereby adjusting the response of the engine.

Traditionally, variable geometry mechanisms are controlled as a function of the speed of the engine. However, these techniques lead to poor compressor-stage matching and limit the range of functionality of engine spools. There is therefore a need for improved control schemes for variable geometry mechanisms.

SUMMARY

In accordance with a broad aspect, there is provided a method for controlling an engine having a variable geometry mechanism, comprising: determining a pressure ratio between a first pressure at an inlet of the engine and a predetermined reference pressure; determining an output power for the engine; adjusting the output power based at least in part on the pressure ratio to obtain a corrected output power; generating a position control signal for the variable geometry mechanism of the engine based on the corrected output power and the pressure ratio; and outputting the position control signal to a controller of the engine to control the variable geometry mechanism.

In some embodiments, the method further comprises determining a first temperature at an inlet of the engine, and adjusting the output power comprises adjusting the output power based at least in part on the first temperature and a reference temperature.

In some embodiments, determining the first temperature comprises estimating the first temperature based on at least one second temperature measured at another location of the engine.

In some embodiments, the method further comprises determining the first pressure.

In some embodiments, determining the first pressure comprises estimating the first pressure based on at least one second pressure measured at another location of the engine.

In some embodiments, the engine is an engine of an aircraft, the method further comprises determining a Mach number for the aircraft, and adjusting the output power comprises adjusting the output power based at least in part on the Mach number.

In some embodiments, the position control signal is a first position control signal, the variable geometry mechanism is a first variable geometry mechanism associated with a first spool compression system, and the method further comprises: determining an output torque for the engine; adjusting the output torque based at least in part on the pressure ratio to obtain a corrected output torque; determining a first temperature at an inlet of the engine; determining a speed of a second spool compression system, the second spool compression system being separate from the first spool compression system; adjusting the speed of the second spool compression system based at least in part on the first temperature and a reference temperature to obtain a corrected speed; generating a second position control signal for a second variable geometry mechanism of the engine based on the corrected output torque and the corrected speed, the second variable geometry mechanism being associated with the second spool compression system; and outputting the second position control signal to the controller to control the variable geometry mechanism.

In some embodiments, the first spool compression system is a high-spool compression system, the second spool compression system is a low-spool compression system, outputting the first position control signal to the engine comprises outputting the first position control signal to a controller of the high-spool compression system, and outputting the second position control signal comprises outputting the second control signal to a controller of the low-spool compression system.

In some embodiments, the engine is an engine of an aircraft, the method further comprises determining a Mach number for the aircraft, and adjusting the output torque comprises adjusting the output torque based at least in part on the Mach number.

In some embodiments, generating the first and second position control signals comprises generating the first and second position control signals based on a compressor-stage matching algorithm.

In accordance with another broad aspect, there is provided an engine control system for an engine having a variable geometry mechanism, comprising: a processing unit; and a non-transitory computer-readable memory communicatively coupled to the processing unit and comprising computer-readable program instructions executable by the processing unit for: determining a pressure ratio between a first pressure at an inlet of the engine and a predetermined reference pressure; determining an output power for the engine; adjusting the output power based at least in part on the pressure ratio to obtain a corrected output power; generating a position control signal for a variable geometry mechanism of the engine based on the corrected output power and the pressure ratio; and controlling the variable geometry mechanism based on the position control signal.

In some embodiments, the computer-readable program instructions are further executable by the processing unit for determining a first temperature at an inlet of the engine, and adjusting the output power comprises adjusting the output power based at least in part on the first temperature and a reference temperature.

In some embodiments, determining the first temperature comprises estimating the first temperature based on at least one second temperature measured at another location of the engine.

In some embodiments, the computer-readable program instructions are further executable by the processing unit for determining the first pressure.

In some embodiments, determining the first pressure comprises estimating the first pressure based on at least one second pressure measured at another location of the engine.

In some embodiments, the engine is an engine of an aircraft, the computer-readable program instructions are further executable by the processing unit for determining a Mach number for the aircraft, and adjusting the output power comprises adjusting the output power based at least in part on the Mach number.

In some embodiments, the position control signal is a first position control signal, the variable geometry mechanism is a first variable geometry mechanism associated with a first spool compression system, and the computer-readable program instructions are further executable by the processing unit for: determining an output torque for the engine; adjusting the output torque based at least in part on the pressure ratio to obtain a corrected output torque; determining a first temperature at an inlet of the engine; determining a speed of a second spool compression system, the second spool compression system being separate from the first spool compression system; adjusting the speed of the second spool compression system based at least in part on the first temperature and a reference temperature to obtain a corrected speed; generating a second position control signal for a second variable geometry mechanism of the engine based on the corrected output torque and the corrected speed, the second variable geometry mechanism being associated with the second spool compression system; and controlling the variable geometry mechanism based on the second position control signal.

In some embodiments, the first spool compression system is a high-spool compression system, the second spool compression system is a low-spool compression system, controlling the variable geometry mechanism based on the first position control signal comprises outputting the first position control signal to a controller of the high-spool compression system, and controlling the variable geometry mechanism based on the second position control signal comprises outputting the second control signal to a controller of the low-spool compression system.

In some embodiments, the engine is an engine of an aircraft, the computer-readable program instructions are further executable by the processing unit for determining a Mach number for the aircraft, and adjusting the output torque comprises adjusting the output torque based at least in part on the Mach number.

In some embodiments, generating the first and second position control signals comprises generating the first and second position control signals based on a compressor-stage matching algorithm.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
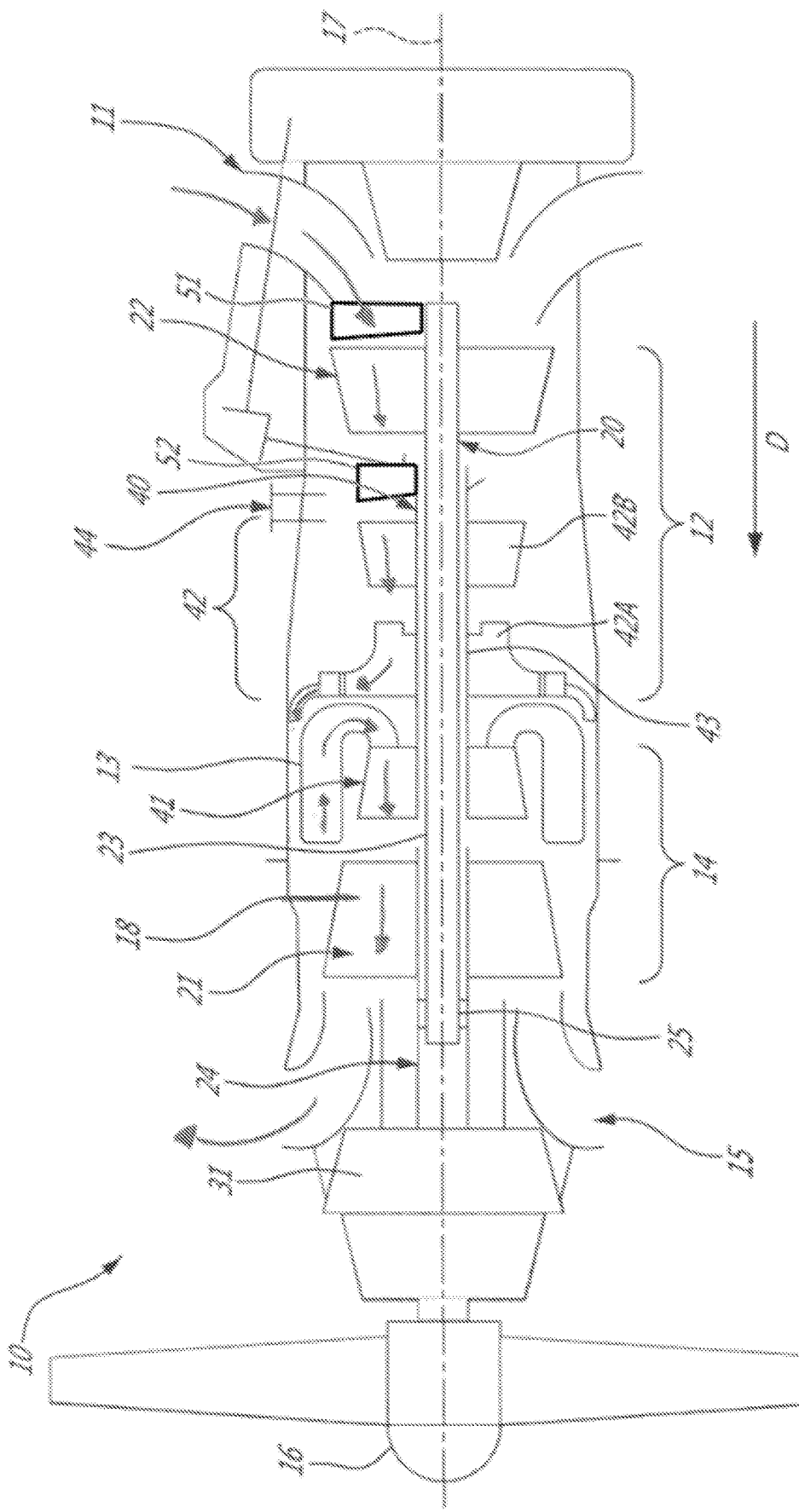
FIG. 1 is a schematic cross-sectional view of a gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 defining a gas path through which gases flow as depicted by flow arrows in FIG. 1. The exemplified engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

Although illustrated as a turboprop engine, the gas turbine engine 10 may alternatively be another type of engine, for example a turbofan engine, also generally comprising in serial flow communication a compressor section, a combustor, and a turbine section, and a fan through which ambient air is propelled. A turboshaft engine may also apply. Similarly, although illustrated as a reverse-flow engine, the techniques described herein can also be applied to through-flow engines. In addition, although the engine 10 is described herein for flight applications, it should be understood that other uses, such as industrial or the like, may apply.

Still referring to FIG. 1, the engine 10 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about axis 17. However, it is understood that a multi-spool engine could have more than two spools. It should also be noted that the embodiments described herein also consider the use of single-spool engines.

The LP spool 20 includes at least one component to compress the air that is part of the compressor section 12, and at least one component to extract energy from the combustion gases that is part of the turbine section 14. More particularly, the LP spool 20 has a low pressure turbine 21 which extracts energy from the combustion gases, and which is drivingly engaged to an LP compressor 22 for pressurizing the air. The LP turbine 21 (also referred to as the power turbine) drives the LP compressor 22, thereby causing the LP compressor 22 to pressurize the air. Both the LP turbine 21 and the LP compressor 22 are disposed along the axis 17.

In the depicted embodiment, both the LP turbine 21 and the LP compressor 22 are axial rotatable components having an axis of rotation that is coaxial with the center axis 17. They can include one or more stages, depending upon the desired engine thermodynamic cycle, for example.

In the depicted embodiment, the LP spool 20 has a power shaft 23 which mechanically couples the LP turbine 21 and the LP compressor 22, and extends axially between them. The shaft 23 is coaxial with the central axis 17 of the engine 10. The shaft 23 allows the LP turbine 21 to drive the LP compressor 22 during operation of the engine 10. The shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the shaft 23 can be combined with a geared LP compressor 22 to allow the LP compressor 22 to run at a different rotational speed from the LP turbine 21. This can provide more flexibility in the selection of design points for the LP compressor.

Still referring to FIG. 1, the engine 10 includes an output drive shaft 24. The drive shaft 24 extends forwardly from the LP turbine 21 and is drivingly engaged thereto. In the illustrated example, the drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23, 24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23, 24. For example, the power and drive shafts 23, 24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine 21. The drive shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through known gear reduction techniques. The RGB 31 allows for the propeller 16 to be driven at its optimal rotational speed, which is different from the rotational speed of the LP turbine 21.

Still referring to FIG. 1, the HP spool 40 with at least one component to compress the air that is part of the compressor section 12, and at least one component to extract energy from the combustion gases that is part of the turbine section 14. The HP spool 40 is also disposed along the axis 17 and includes an HP turbine 41 drivingly engaged (e.g. directly connected) to a high pressure compressor 42 by an HP shaft 43 rotating independently of the power shaft 23. Similarly to the LP turbine 21 and the LP compressor 22, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22. The engine 10 shown in FIG. 1 is thus a "two-spool" engine 10.

The HP turbine 41 and the HP compressor 42 can have any suitable mechanical arrangement to achieve the above-described split compressor functionality. For example, and as shown in FIG. 1, the HP spool 40 includes a high pressure shaft 43 extending between the HP compressor 42 and the HP turbine section 41. The high pressure shaft 43 is coaxial with the power shaft 23 and rotatable relative thereto. The relative rotation between the high pressure shaft 43 and the power shaft 23 allow the shafts 23, 43 to rotate at different rotational speeds, thereby allowing the HP compressor 42 and the LP compressor 22 to rotate at different rotational speeds. The HP shaft 43 can be mechanically supported by the power shaft 23 using bearings or the like. In the depicted embodiment, the power shaft 23 is at least partially disposed within the HP shaft 43.

The split compressor arrangement also allows bleed air to be drawn from between the HP compressor 42 and the LP compressor 22. More particularly, in the embodiment of FIG. 1, the engine 10 includes an inter-stage bleed 44 port or valve that is aft of the HP compressor 42 and forward of the LP compressor 22, which may provide for increased flexibility in the available bleed pressures. In a particular embodiment, the bleed pressure design point of the inter-stage bleed 44 is selected based on the pressure ratio of the LP compressor 22, which runs independently from the HP compressor 42. For operability, variable inlet guide vanes (VIGV) 51 and variable guide vanes (VGV) 52 can be used on the LP compressor 22 and at the entry of the HP compressor 42, together with the inter-stage bleed 44.

It should be noted that the engine of FIG. 1 represents only one example engine, and that the embodiments described herein can be applied to any other suitable manner of engine.

In some embodiments, the engine 10 includes one or more variable geometry mechanisms (VGMs) which may assist in achieving optimized engine transient response. In some embodiments, the VGMs consists of one or more VGVs, for instance the VIGV 51 and the VGV 52, which may be one of inlet compressor guide vanes for directing air into the compressor section 12, outlet guide vanes for directing air out of the compressor section 12, variable stator vanes for directing incoming air into rotor blades of the engine 10, and/or one or more variable nozzles, variable bleed-off valves, for instance the inter-stage bleed 44, and the like. It should be understood that one or more of the above-mentioned VGMs may be adjusted for the purpose of decreasing the response time of the engine 10 during rapid engine transitions, e.g. from low to high power levels, or vice-versa. Indeed, adjustment of the position (e.g. the angle) of the VGMs can impact the inlet mass flow to the engine 10, and in turn allow the engine 10 to operate at a required power.

In some embodiments, as illustrated in FIG. 1, the engine 10 has a dual compression system with a low-spool compression system (LPC), including the LP spool 20, and a high-spool compression system (HPC), including the HP spool 40, which are separate from one-another. The VGMs include the VIGV 51 at the air inlet 11 near the LPC and the VGVs 52 upstream of the HPC. It should be noted that other VGMs may also be included for both the LPC and the HPC. In other embodiments, the engine 10 includes only one compression system, and includes fewer or more VGMs.

Figure 2A:
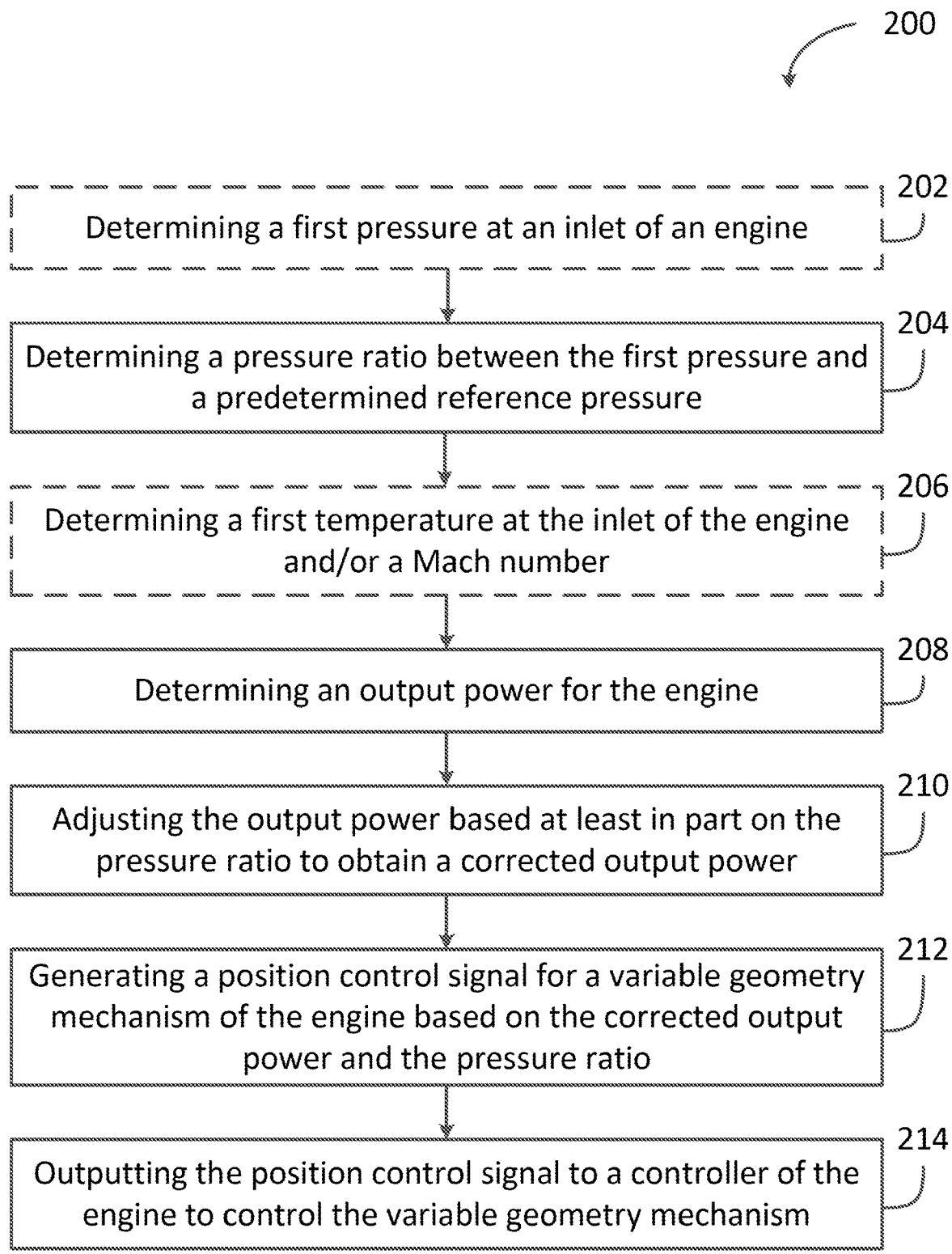
FIGS. 2A-B are flowcharts illustrating an example method for controlling the engine of FIG. 1, in accordance with an illustrative embodiment.

With reference to FIG. 2A, there is illustrated a flowchart of an example method 200 for controlling an engine, for example the engine 10, which may be a part of an aircraft. In some embodiments, the method 200 is used to control the embodiments of the engine 10 having a dual compression system. In other embodiments, the method 200 is used to control embodiments of the engine 10 having only a single compression system.

At step 202, optionally a first pressure is determined. The first pressure is the pressure measured at an inlet to the engine 10, which in some embodiments is the air inlet 11 to the LP spool 20 of the engine 10. The first pressure may be measured using any suitable sensor or other measuring device, or may be estimated based on other parameters of the engine 10. In some embodiments, the first pressure at the air inlet 11 is estimated based on another pressure reading or measurement obtained proximate the air inlet 11, or at some other location within the engine 10. For example, the first pressure can be estimated based on a pressure measured by a separate avionics system. In some embodiments, the control of the engine 10 is performed with the first pressure already being known, and so step 202 may be skipped.

At step 204, a pressure ratio between the first pressure and a predetermined reference pressure is determined. The pre-determined reference pressure may be any suitable reference pressure value, for example one standard atmosphere (1 atm, also expressed as 14.696 psia, 101.325 kPa, etc.). The pressure ratio may be determined in any suitable format, including as a percent-change vis-à-vis the predetermined reference pressure, an absolute pressure radio, a relative pressure ratio expressed as a fraction of the predetermined reference pressure, and the like. The pressure ratio may be determined by dividing the first pressure by the predetermined reference pressure, or the converse, or by performing any other suitable calculation. For example, the pressure ratio is determined using the following equation:

$$\delta = \frac{P_1}{P_{ref}} \qquad [1]$$

where $\delta$ is the pressure ratio, $P_1$ is the first pressure, and $P_{ref}$ is the predetermined reference pressure.

Optionally, at step 206, one or more additional parameters associated with the engine 10 are determined. In some embodiments, a first temperature is determined. The first temperature can be the temperature measured at the air inlet 11 to the engine 10, the temperature measured at an inlet of a compression stage (LP spool 20 or HP spool 40), or the temperature measured at an outlet of the compression stage (LPC or HP spool 40). The first temperature may be measured using any suitable sensor or other measuring device, or may be estimated based on other parameters of the engine 10. In other embodiments, a Mach number for the aircraft of which the engine 10 is a part is determined. The Mach number for the aircraft may be determined using any suitable techniques, and in some embodiments an airspeed can be used instead of the Mach number. Still other parameters associated with the engine 10 (e.g. bleed air extraction, accessory gearbox (AGB) power extraction) may be determined and used to control the position of the VGMs.

At step 208, an output power for the engine 10 is determined. In some embodiments, the engine 10 is configured for monitoring and reporting the output power via one or more sensors or other measuring device(s). In other embodiments, the output power is determined by one or more elements outside the engine 10, for example one or more control systems which govern operation of the engine 10, and/or one or more other elements which make use of the power and/or torque produced by the engine 10. In some other embodiments, the output power for the engine 10 can be estimated using one or more models for the engine 10.

At step 210, the output power determined at step 208 is adjusted, at least in part based on the pressure ratio, to obtain a corrected output power. In some embodiments, the output power is also adjusted using the first temperature, the Mach number, and any other suitable values. For example, the corrected power is determined using the following equation:

$$SHP_N = \frac{SHP}{\delta \cdot \sqrt{\frac{T_1}{T_{ref}}} \cdot M_{Corr}} \qquad [2]$$

where $SHP_N$ is corrected power, SHP is the output power, $T_1$ is the first temperature, $T_{ref}$ is a reference temperature, and $M_{corr}$ a correction factor based on the Mach number. In another example, one or more terms are eschewed from equation [2] above, for instance the term $\delta$, the term $$\sqrt{\frac{T_1}{T_{ref}}}$$

and/or the term $M_{corr}$.

At step 212, a position control signal for one or more of the VGMs of the engine 10 is generated based on the corrected output power and the pressure ratio. The position control signal may be any suitable type of signal, encoded in any suitable format. In some embodiments, the position control signal is generated using one of a plurality of schedules, which may be selected based on an altitude at which the engine 10 is operating and/or the pressure ratio described hereinabove.

At step 214, the position control signal is output to the engine 10 and/or to a controller thereof in order to control the VGMs. The position control signal may be transmitted using any suitable communication medium. In some embodiments, the position control signal is output to the engine 10, or to the controller thereof, to cause a change in the position of the VGMs. In other embodiments, the position control signal is output to the VGMs themselves. For example, the position control signal can be for altering the position of the VIGV 51, the VGV 52, or any other suitable VGM.

Figure 2B:
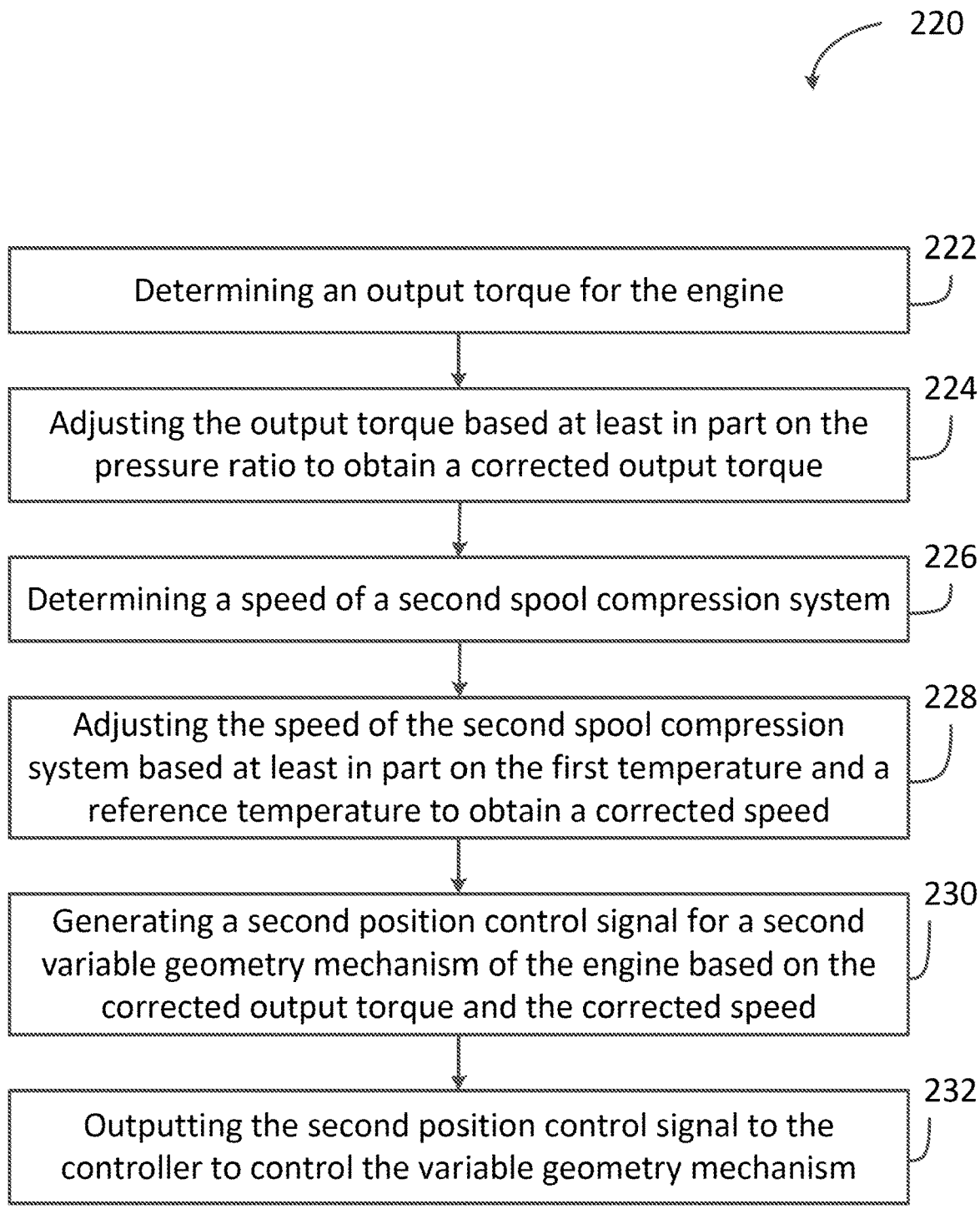

With reference to FIG. 2B, there is illustrated a flowchart of an example method 220 for controlling an engine, for instance the engine 10. In embodiments of the engine 10 having a dual compression system, the method 200 is used to control the operation of the VGMs upstream of the HP spool 40, for instance the VGV 52, and the method 220 is used to control the operation of the VGMs upstream of the LP spool 20, for instance the VIGV 51.

At step 222, an output torque for the engine 10 is determined. In some embodiments, the engine 10 is configured for monitoring and reporting the output torque via one or more sensors or other measuring device(s). In other embodiments, the output torque is determined by one or more elements outside the engine 10, for example one or more control systems which govern operation of the engine 10, and/or one or more other elements which make use of the power and/or torque produced by the engine 10. In some other embodiments, the output torque for the engine 10 can be estimated using one or more models for the engine 10.

At step 224, the output torque determined at step 222 is adjusted, at least in part based on the pressure ratio, to obtain a corrected output torque. In some embodiments, the output torque is also adjusted using the Mach number and/or any other suitable values. For example, the corrected torque is determined using the following equation:

$$Q_N = \frac{Q}{\delta \cdot M_{Corr}} \quad [3]$$

where $Q_N$ is corrected torque and Q is the output torque. In another example, one or more terms are eschewed from equation [3] above, for instance the term $M_{Corr}$.

At step 226, a speed for a second spool compression system of the engine 10, for example the LP spool 20, is determined. In some embodiments, the engine 10 and/or the LP spool 20 is configured for monitoring and reporting the speed via one or more sensors or other measuring device(s). In other embodiments, the speed is determined by one or more elements outside the engine 10, for example one or more control systems which govern operation of the engine 10.

At step 228, the speed determined at step 226 is adjusted, at least in part based on the first temperature and the reference temperature, to obtain a corrected speed. For example, the corrected speed is determined using the following equation:

$$N_{LPC_N} = N_{LPC} \cdot \sqrt{\frac{T_{ref}}{T_1}} \quad [4]$$

where $N_{LPC_N}$ is corrected speed and $N_{LPC}$ is the speed of the LP spool 40.

At step 230, a second position control signal for a second VGM of the engine 10, for example the VIGV 51 upstream of the LP spool 20, is generated based on the corrected output torque and the corrected speed. The second position control signal may be any suitable type of signal, encoded in any suitable format.

At step 232, the second position control signal is output to the engine 10 and/or to the controller of the engine 10 to control the VIGV 51. The second position control signal may be transmitted using any suitable communication medium. In some embodiments, the second position control signal is output to the engine 10, or to a controller thereof, to cause a change in the position of the VIGV 51. In other embodiments, the position control signal is output to the VIGV 51 themselves.

By performing the methods 200 and 220, it may be possible to perform more flexible compressor matching between the HP spool 40 and the LP spool 20, may allow the HP spool 40 and LP spool 20 to operate independently from one another, and may lead to simpler optimization of the operation of the engine 10. In addition, the power output of the engine 10 may be varied without requiring changes to the speed of the spools of the engine 10. In some embodiments, the HP spool 40 and/or the LP spool 20 can be operated at constant speeds, or even have their respective speeds reduced, while still increasing the output power of the engine 10, within certain operating ranges.

For example, compressor matching between the LP spool 20 and the HP spool 40 can be accomplished using power- and/or torque-based control scheme(s), since both are indicators of a mass flow passing through the LPC and HPC stages. Unlike speed-based control schemes, power- and torque-based algorithms can passively adapts to temperature and pressure errors resulting from sensors inaccuracies or sudden changes to compressor inlet temperature and/or pressure, as temperature and pressure directly impact air density and overall engine power or torque. Thus, the techniques disclosed herein can avoid having to rely on complex switching logics to transition from speed-based control schemes to other types of controls should it be required to maintain constant compressor speed over a given mass flow or power range.

It should be noted that any one or more of the values used in generating the position control signals for the VGMs of the HP spool 40 and LP spool 20 may be estimated or synthesized based on values acquired at other locations in the engine 10, or in a larger system of which the engine 10 forms a part.

Figure 3:
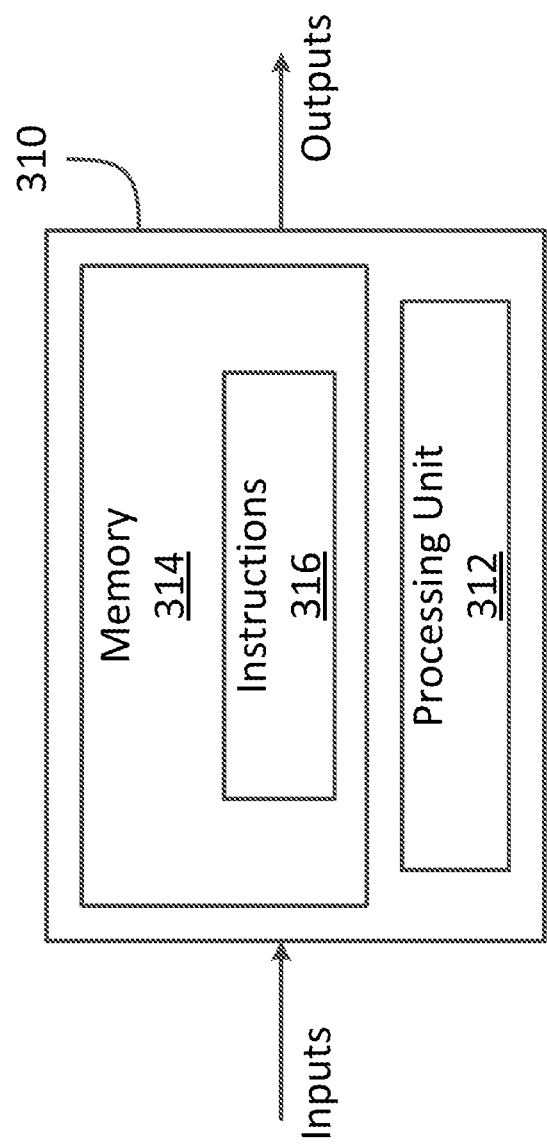
FIG. 3 is a block diagram of an example computer system for implementing the method of FIG. 2.

With reference to FIG. 3, the methods 200 and 220 may be implemented by a computing device 310, comprising a processing unit 312 and a memory 314 which has stored therein computer-executable instructions 316. The processing unit 312 may comprise any suitable devices configured to implement the methods 200 and 220 such that instructions 316, when executed by the computing device 310 or other programmable apparatus, may cause the functions/acts/steps performed as part of the methods 200 and 220 as described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

Figure 4:
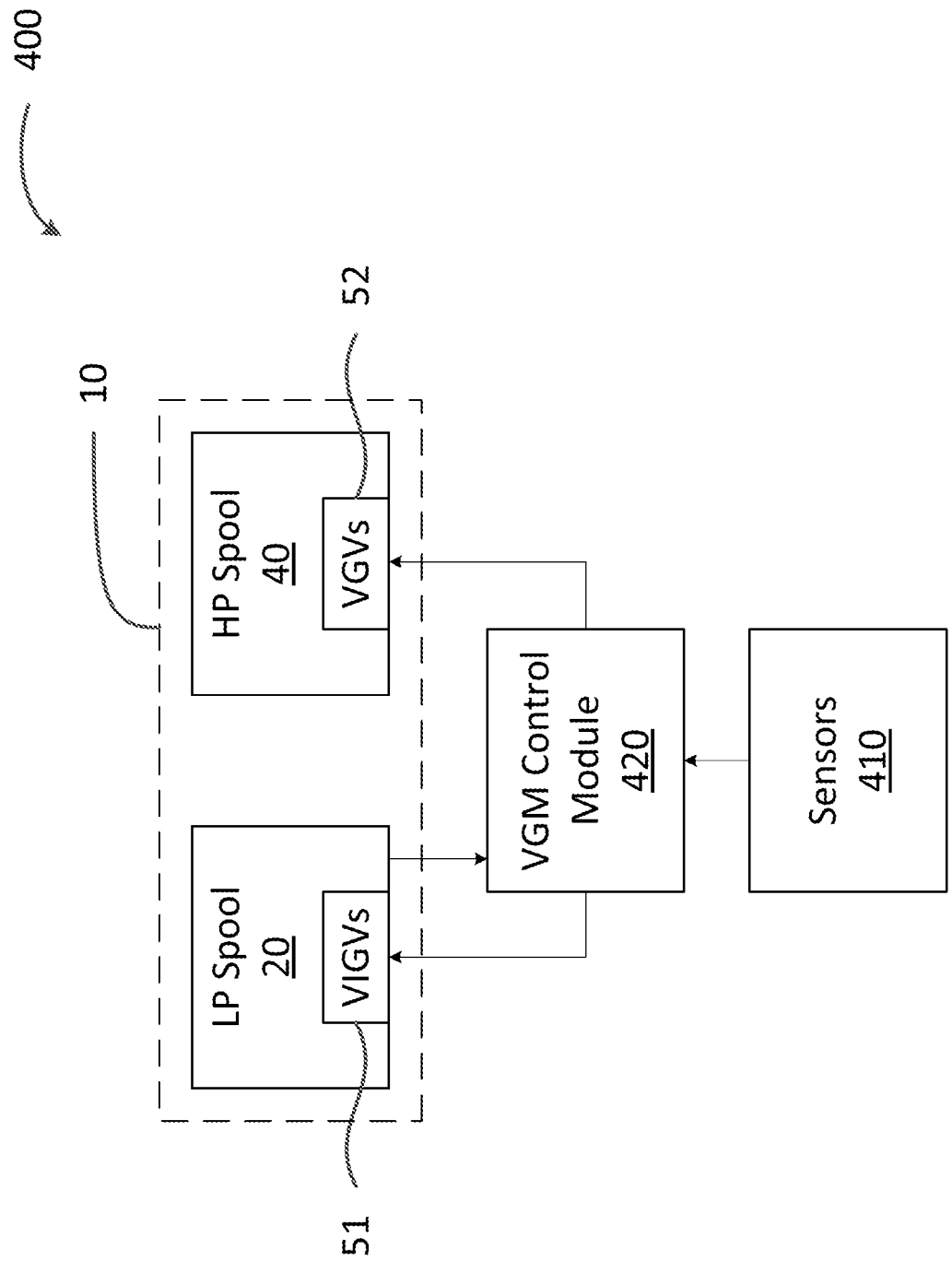
FIG. 4 is a block diagram of an example engine system.

With reference to FIG. 4, in some embodiments the engine 10 is part of an engine system 400 of an aircraft. The engine system 400 additionally includes sensors 410 and a VGM control module 420. The engine 10 is communicatively coupled to the VGM control module 420, and the VGM control module 420 is coupled to the sensors 410.

As described hereinabove, in some embodiments the engine 10 includes the LP spool 20 and the HP spool 40. Each of the LP spool 20 and the HP spool 40 have one or more VGMs, for example the VIGVs 51 for the LP spool 20 and the VGVs 52 for the HP spool 40. It should be noted that the engine 10 can include any suitable number of VGMs, including any suitable number of VGVs, variable stator vanes, variable nozzles, variable bleed-off valves, and the like. The engine 10 is configured for producing power and torque, and each of the LP spool 20 and the HP spool 40 operate at respective speeds. In some embodiments, the LP spool 20 is configured for providing a value for the speed of the LP spool 20 to the VGM control module 420. In some additional embodiments, the HP spool 40 is configured for providing the VGM control module 420 with one or more The sensors 410 are configured for measuring or otherwise determining values for various characteristics of the engine 10. In some embodiments, the sensors 410 include one or more pressure sensors, one or more temperature sensors, one or more speed sensors, one or more torque sensors, one or more power sensors, and the like. In some embodiments, the sensors 410 include one or more soft sensors which are configured for estimating or synthesizing one or more values for various characteristics of the engine 10 based on other measurements. The sensors 410 are configured for providing any number of values for the characteristics of the engine 10 to the VGM control module 420.

The VGM control module 420 is configured for implementing at least part of the methods 200 and 220. The VGM control module 420 is configured for optionally receiving a first pressure, indicative of a pressure at an inlet of the engine 10, for instance the air inlet 11, which can be received, for example, from the sensors 410 or from the engine 10, in accordance with step 202. The VGM control module 420 is also configured for determining a pressure ratio between the first pressure and a predetermined reference pressure, in accordance with step 204. In some embodiments, the VGM control module 420 is configured for obtaining the predetermined reference pressure from a remote source, such as a database or other memory. In other embodiments, the predetermined reference pressure is substantially constant, and the VGM control module 420 may have hardcoded therein the predetermined reference pressure. The VGM control module 420 is configured for optionally receiving a first temperature, indicative of a temperature at an inlet of the engine 10, for instance the air inlet 11, a Mach number for an aircraft of which the engine 10 forms a part, or any other suitable characteristic of the engine 10, for example from the sensors 410 or from the engine 10, in accordance with step 206.

The VGM control module 420 is also configured for determining an output power for the engine 10, in accordance with step 208. In some embodiments, the VGM control module 420 receives the output power from the engine 10 itself. In other embodiments, the VGM control module 420 receives the output power from the sensors 410. The VGM control module 420 is further configured for adjusting the output power based at least in part on the pressure ratio to obtain corrected output power, as per step 210. In some embodiments, the VGM control module 420 also adjusts the output power on the basis of the first temperature and a reference temperature and/or the Mach number.

The VGM control module 420 is additionally configured for generating a position control signal for one or more of the VIGV 51 and the VGV 52 of the engine 10 based on the corrected output power and the pressure ratio, in accordance with step 212. The position control signal can be any suitable signal, generated in any format. The VGM control module 420 is configured for outputting the position control signal to the engine 10, in accordance with step 214. In some embodiments in which the engine has a single spool compressor system, the VGM control module 420 outputs the position control signal to the VGM associated with the single spool compressor system. In embodiment in which the engine 10 has both the LP spool 20 and the HP spool 40, the position control is a first position control signal which is output to the VGV 52 of the HP spool 40, or to any suitable controller for the VGV 52.

In embodiments in which the engine 10 has both the LP spool 20 and the HP spool 40, the VGM control module 420 is further configured for determining an output torque for the engine 10, in accordance with step 222. In some embodiments, the VGM control module 420 receives the output torque from the engine 10 itself. In other embodiments, the VGM control module 420 receives the output torque from the sensors 410. The VGM control module 420 is further configured for adjusting the output torque based at least in part on the pressure ratio to obtain corrected output torque, as per step 224. In some embodiments, the VGM control module 420 also adjusts the output power on the basis of the Mach number.

The VGM control module 420 is also configured for determining a speed for the LP spool 20, in accordance with step 226. In some embodiments, the VGM control module 420 receives the speed from the LP spool 20 itself. In other embodiments, the VGM control module 420 receives the speed from the sensors 410. The VGM control module 420 is further configured for adjusting the speed for the LP spool 20 based at least in part on the first temperature and the reference temperature to obtain corrected speed, as per step 228.

The VGM control module 420 is additionally configured for generating a second position control signal for the VIGV 51 of the LP spool 20 of the engine 10 based on the corrected output torque and the corrected speed, in accordance with step 230. The second position control signal can be any suitable signal, generated in any format. The VGM control module 420 is configured for outputting the second position control signal to the engine 10, in accordance with step 232. In some embodiments, the second position control signal is output to the LP spool 20 and/or to the VIGV 51.

The engine 10 is configured for receiving the first position control signal, and in some embodiments the second position control signal, and for effecting a change in the geometry of the VIGV 51 and optionally the VGV 52 based on the first and second position control signals, respectively. In some embodiments, the HP spool 40 and/or the VGV 52 are configured for receiving the first position signal and for effecting the change in the geometry of the VGV 52. In some embodiments, the LP spool 20 and/or the VIGV 51 are configured for receiving the second position signal and for effecting the change in the geometry of the VIGV 51.

It should be noted that the VGM control module 420, and any other suitable elements of the engine system 400, may be implemented as part of a full-authority digital engine controls (FADEC) or other similar device, including electronic engine control (EEC), engine control unit (EUC), various actuators, and the like.

The methods and systems for controlling an engine described herein may be implemented in a high level procedural or object oriented programming or scripting language, or a combination thereof, to communicate with or assist in the operation of a computer system, for example the computing device 310. Alternatively, the methods and systems for controlling an engine may be implemented in assembly or machine language. The language may be a compiled or interpreted language. Program code for implementing the methods and systems for controlling an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling an engine may also be considered to be implemented by way of a non-transitory computer-readable storage medium having a computer program stored thereon. The computer program may comprise computer-readable instructions which cause a computer, or more specifically the processing unit 312 of the computing device 310, to operate in a specific and predefined manner to perform the functions described herein, for example those described in the methods 200 and 220.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling an engine, comprising:
determining a pressure ratio between a first pressure at an inlet of the engine and a predetermined reference pressure;
determining an output power and an output torque for the engine;
adjusting the output power based at least in part on the pressure ratio to obtain a corrected output power;
adjusting the output torque based at least in part on the pressure ratio to obtain a corrected output torque;
generating a first position control signal for a first variable geometry mechanism of the engine based on the corrected output power and the pressure ratio, the first variable geometry mechanism associated with a first spool compression system of the engine;
determining a first temperature at an inlet of the engine;
determining a speed of a second spool compression system, the second spool compression system being separate from the first spool compression system;
adjusting the speed of the second spool compression system based at least in part on the first temperature and a reference temperature to obtain a corrected speed;
generating a second position control signal for a second variable geometry mechanism of the engine based on the corrected output torque and the corrected speed, the second variable geometry mechanism being associated with the second spool compression system; and
outputting the first position control signal to a controller of the engine to control the first variable geometry mechanism and the second position control signal to the controller to control the second variable geometry mechanism.

2. The method of claim 1, wherein adjusting the output power comprises adjusting the output power based at least in part on the first temperature and the reference temperature.

3. The method of claim 2, wherein determining the first temperature comprises estimating the first temperature based on at least one second temperature measured at another location of the engine.

4. The method of claim 1, further comprising determining the first pressure based on a separate pressure measured by an avionics system associated with the engine.

5. The method of claim 4, wherein determining the first pressure comprises estimating the first pressure based on at least one second pressure measured at another location of the engine.

6. The method of claim 1, wherein the engine is an engine of an aircraft, further comprising determining a Mach number for the aircraft, wherein adjusting the output power comprises adjusting the output power based at least in part on the Mach number.

7. The method of claim 1, wherein the first spool compression system is a high-spool compression system, wherein the second spool compression system is a low-spool compression system, wherein outputting the first position control signal to the engine comprises outputting the first position control signal to a controller of the high-spool compression system, and wherein outputting the second position control signal comprises outputting the second control signal to a controller of the low-spool compression system.

8. The method of claim 1, wherein the engine is an engine of an aircraft, further comprising determining a Mach number for the aircraft, wherein adjusting the output torque comprises adjusting the output torque based at least in part on the Mach number.

9. The method of claim 1, wherein generating the first and second position control signals comprises generating the first and second position control signals based on a compressor-stage matching algorithm.

10. An engine control system for an engine having a variable geometry mechanism, comprising:
a processing unit; and
a non-transitory computer-readable memory communicatively coupled to the processing unit and comprising computer-readable program instructions executable by the processing unit for:
determining a pressure ratio between a first pressure at an inlet of the engine and a predetermined reference pressure;
determining an output power and an output torque for the engine;
adjusting the output power based at least in part on the pressure ratio to obtain a corrected output power;
adjusting the output torque based at least in part on the pressure ratio to obtain a corrected output torque;
generating a first position control signal for a first variable geometry mechanism of the engine based on the corrected output power and the pressure ratio, the first variable geometry mechanism associated with a first spool compression system of the engine;
determining a first temperature at an inlet of the engine;
determining a speed of a second spool compression system, the second spool compression system being separate from the first spool compression system;
adjusting the speed of the second spool compression system based at least in part on the first temperature and a reference temperature to obtain a corrected speed;
generating a second position control signal for a second variable geometry mechanism of the engine based on the corrected output torque and the corrected speed, the second variable geometry mechanism being associated with the second spool compression system; and
outputting the first position control signal to a controller of the engine to control the first variable geometry mechanism and the second position control signal to the controller to control the second variable geometry mechanism.

11. The system of claim 10, wherein adjusting the output power comprises adjusting the output power based at least in part on the first temperature and the reference temperature.

12. The system of claim 11, wherein determining the first temperature comprises estimating the first temperature based on at least one second temperature measured at another location of the engine.

13. The system of claim 10, wherein the computer-readable program instructions are further executable by the processing unit for determining the first pressure based on a separate pressure measured by an avionics system associated with the engine.

14. The system of claim 13, wherein determining the first pressure comprises estimating the first pressure based on at least one second pressure measured at another location of the engine.

15. The system of claim 10, wherein the engine is an engine of an aircraft, wherein the computer-readable program instructions are further executable by the processing unit for determining a Mach number for the aircraft, wherein adjusting the output power comprises adjusting the output power based at least in part on the Mach number.

16. The system of claim 10, wherein the first spool compression system is a high-spool compression system, wherein the second spool compression system is a low-spool compression system, wherein controlling the variable geometry mechanism based on the first position control signal comprises outputting the first position control signal to a controller of the high-spool compression system, and wherein controlling the variable geometry mechanism based on the second position control signal comprises outputting the second control signal to a controller of the low-spool compression system.

17. The system of claim 10, wherein the engine is an engine of an aircraft, wherein the computer-readable program instructions are further executable by the processing unit for determining a Mach number for the aircraft, wherein adjusting the output torque comprises adjusting the output torque based at least in part on the Mach number.

18. The system of claim 10, wherein generating the first and second position control signals comprises generating the first and second position control signals based on a compressor-stage matching algorithm.

* * * * *